United States Patent [19]

Cohn

[11] 4,370,675
[45] Jan. 25, 1983

[54] DOORBELL ACTUATED TELEVISION SECURITY SYSTEM

[75] Inventor: William E. Cohn, Skokie, Ill.

[73] Assignee: Zenith Radio Corporation, Glenview, Ill.

[21] Appl. No.: 222,816

[22] Filed: Jan. 5, 1981

[51] Int. Cl.³ .............................................. H04N 7/18
[52] U.S. Cl. ..................................... 358/108; 358/86; 358/181; 340/825.37
[58] Field of Search ................. 358/108, 139, 181, 86; 340/164 R, 164 A

[56] References Cited

U.S. PATENT DOCUMENTS 3,480,727 11/1969 Moore et al. ........................ 358/108
4,075,659 2/1978 Desanti ................................ 358/108

*Primary Examiner*—John C. Martin
*Assistant Examiner*—Edward L. Coles

[57] ABSTRACT

A video security system with intercom activated by means of a doorbell. The video input to a remote camera is automatically presented on the video display of a television receiver upon activation of the doorbell while audio from the intercom's speaker microphone is output through the television receiver's speaker system. Following a predetermined time interval after doorbell actuation, the system automatically turns off. If the television receiver is on when the doorbell is actuated, the system automatically provides video camera and intercom information at the television, reverting to the received television signal mode of operation upon user selection.

7 Claims, 3 Drawing Figures

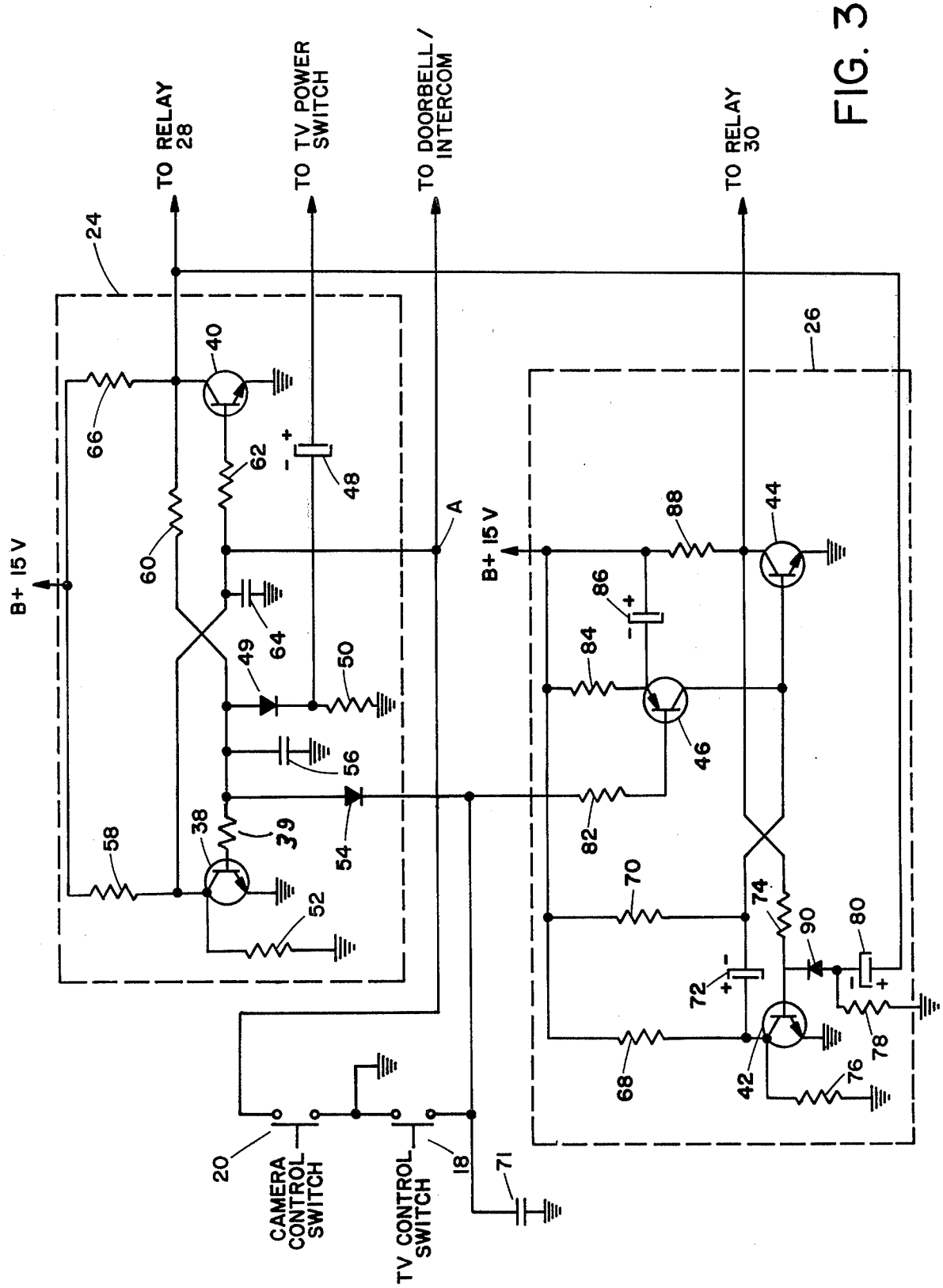

DOORBELL ACTUATED TELEVISION SECURITY SYSTEM

BACKGROUND OF THE INVENTION

This invention relates generally to video security systems, and particularly relates to a video security system in which video information received by a remote camera is displayed on a television receiver with an intercom system, employing the television receiver's audio system, used for verbal communication.

Video displays in combination with a remote television camera have found widespread use as security systems. These systems utilize a video display which is entirely dedicated to a video surveillance mode of operation. Because of the requirement for a dedicated camera and video display, such systems have found use in only a limited number of environments such as in an industrial security system or a hospital patient monitoring system. To date, such security systems have not been integrated with a conventional television receiver and other available household fixtures to provide a video/audio home security system.

The present invention is intended to overcome the limitations of the prior art in providing a video/audio security system which permits the user to view a conventional television receiver in receiving video information while orally communicating with a visitor by means of an intercom system coupled to the audio circuitry of the television receiver.

OBJECTS OF THE INVENTION

Accordingly, it is an object of the present invention to provide an improved audio and video home security system.

It another object of the present invention to provide an improved video security system particularly adapted for home use which uses the video and audio systems of a television receiver to convey information.

Still another object of the present invention is to provide an improved home security system which is activated upon doorbell actuation resulting in television receiver turn-on, or override, permitting video and audio information to be presented by the television receiver.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings in which:

FIG. 3 is a schematic diagram of electronic switching circuitry utilized to control the various switching relays of the present invention.

DESCRIPTION OF THE PREFERRED EMBODIMENTS

Figure 1:
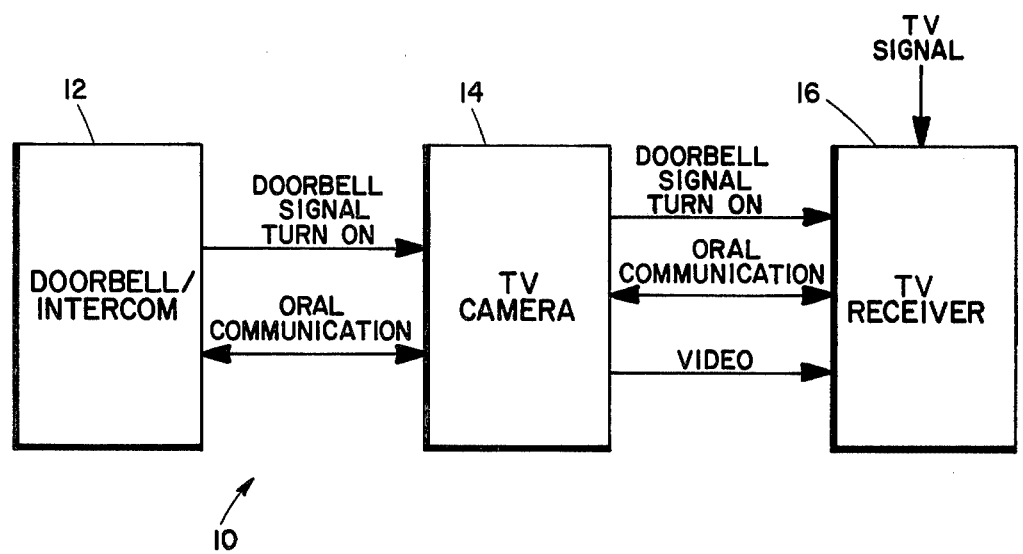
FIG. 1 is a simplified block diagram of a doorbell actuated television security system in accordance with the present invention.

Referring to FIG. 1, there is shown a doorbell actuated television security system 10 in accordance with a preferred embodiment of the present invention. Actuation of a doorbell switch turns on video camera 14 located in the area under surveillance. A doorbell/intercom system 12 is simultaneously activated upon doorbell actuation with one speaker of the intercom system located in proximity to video camera 14. In addition, a turn-on signal is provided to television receiver 16 by means of doorbell/intercom system 12. This not only permits the video signals of camera 14 to be displayed on the cathode ray tube (CRT) of television receiver 16, but also permits two-way aural communication between the remotely located intercom speaker and the speaker system in television receiver 16. Timing circuitry, to be described, permits television receiver 16 to revert to the received television signal mode of operation following a predetermined time interval after doorbell actuation. In addition, manual switches on television receiver 16 permit its operating mode to be changed from television signal viewing to video camera viewing or vice versa by the user at any time. The television security system 10 of the present invention is automatically turned on following doorbell actuation and remains on for a predetermined time period unless de-selected by the user prior to expiration of this time period.

Figure 2:
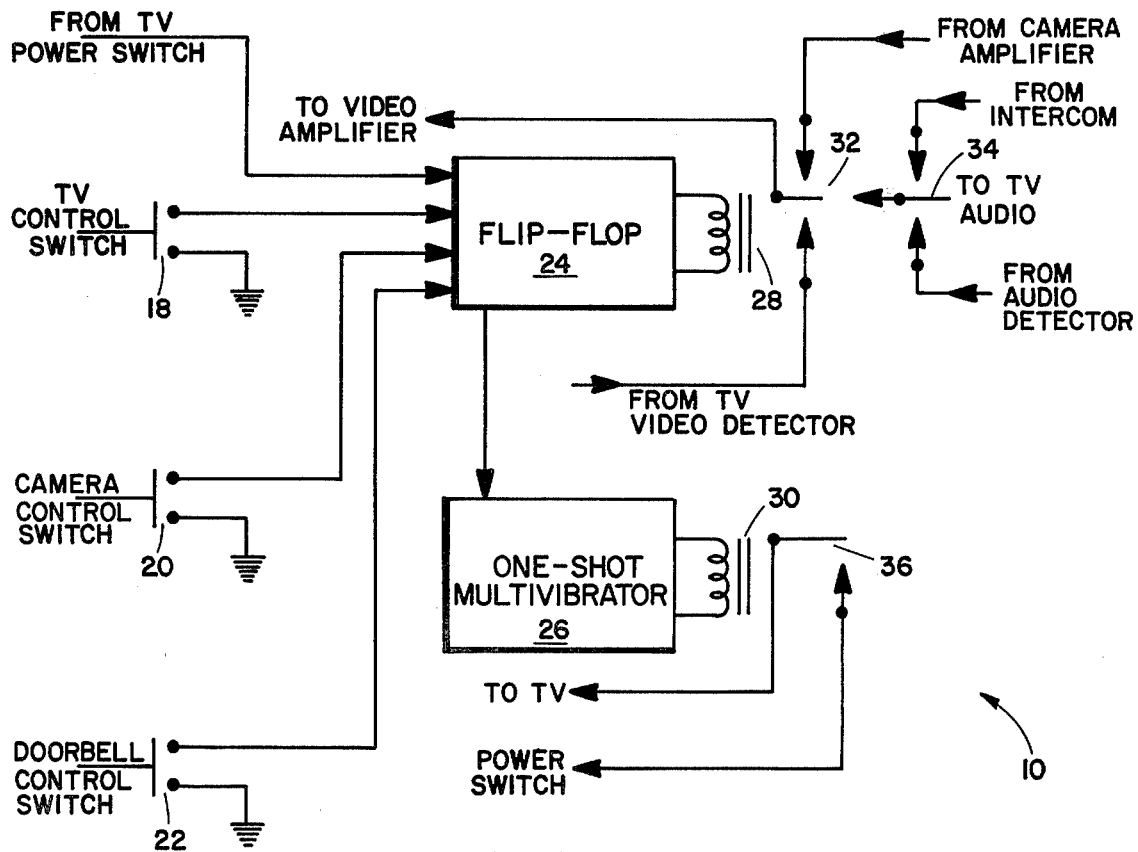
FIG. 2 which is partially in block diagram form and partially in schematic diagram form shows a doorbell actuated television security system in accordance with a preferred embodiment of the present invention.

The doorbell actuated television security system 10 of the present invention is shown in greater detail in FIG. 2. The television security system 10 of the present invention may be activated by means of either camera control switch 20 or doorbell control switch 22. These two switches provide an input to and set flip-flop circuit 24. Television control switch 18 also provides an input to flip-flop circuit 24, but this input re-sets the flip-flop circuit and provides for the alternate mode of operation, the television viewing mode. A third input is provided to flip-flop circuit 24 from the television power switch (not shown) which will be described presently.

Flip-flop circuit 24 is, in turn, coupled to relay 28 which controls switches 32 and 34. A reset signal from either camera control switch 20 or doorbell control switch 22 to flip-flop circuit 24 activates relay 28 so as to set switches 32 and 34 in the video camera viewing mode. When this occurs switch 32 switches from the television receiver video detector circuit (not shown) to the video camera amplifier circuit (not shown). This results in the video output of television camera 14 being provided to the video amplifier of television receiver 16. Similarly, the setting of flip-flop circuit 24 by means of the appropriate input from either camera control switch 20 or doorbell control switch 22 causes relay 28 to actuate switch 34 in switching from the received television signal audio detector to the intercom system to provide an aural communication link between the television receiver 16 and the remotely located doorbell/intercom system 12.

Upon receiving an input from either camera control switch 20 or doorbell control switch 22, flip-flop circuit 24 provides an input to one-shot multivibrator circuit 26. The control signal provided by flip-flop circuit 24 initiates oscillation of multivibrator 26 which is connected to a second relay 30, the state of which is controlled by multivibrator 26. If multivibrator oscillation is initiated by an input signal from flip-flop circuit 24, switch 36, which is connected to the power switch of television receiver 16, is positioned to permit the turn-on of television receiver 16. In this manner, television receiver 16 is turned on following doorbell control switch 22 or camera control switch 20 actuation. Television security system 10 will remain on in the camera viewing mode of operation for as long as multivibrator 26 oscillates and, in turn, switch 36 is engaged by the action of relay 30. The duration of this interval may be carefully controlled by the proper selection of components to provide a given RC time constant in multivibrator 26. In the preferred embodiment of the present invention the RC time constant of multivibrator 26 is selected to provide a five minute interval between doorbell control switch 22 engagement and the turn off of the video camera viewing mode of operation of television receiver 16 if no other inputs to the system are provided by a user. Complete turn off of the television security system is accomplished by means of disengagement of switch 36 which is connected to the television receiver's power switch. If television receiver 16 is in the television signal viewing mode of operation when doorbell control switch 22 or camera control switch 20 in engaged, flip-flop circuit 24 initiates switching to the video camera viewing mode and the later timing out of multivibrator 26 and the disengagement of switch 36 has no effect on television receiver 16. In this case, television receiver 16 will continue in the video camera viewing mode until either TV control switch 18 is engaged or television receiver 16 is turned off. If television receiver 16 is turned off a signal is provided from its power switch to flip-flop circuit 24 changing the state of the flip-flop to the television signal viewing mode such that when the television receiver is again turned on it operates in the television signal viewing mode.

FIG. 3 shows a schematic diagram of the flip-flop circuit 24 and multivibrator 26 combination as utilized in a preferred embodiment of doorbell actuated television security system 10. Camera control switch 20 and the lead to the doorbell/intercom system are in parallel and are connected to point "A" and thence to flip-flop circuit 24. Actuation of either camera control switch 20 or the doorbell (not shown) grounds the collector of transistor 38 causing transistor 40 to turn off. When transistor 40 turns off, its collector goes high causing transistor 38 to turn on producing an output signal at the collector of transistor 40 which is connected to relay 28 in FIG. 2. As a result, relay 28 is pulled in causing switches 32 and 34 to operate in the video camera viewing mode.

The base of transistor 38 is connected to television receiver power switch (not shown) such that if the television receiver is turned off while in the video camera viewing mode, flip-flop circuit 24 is automatically re-set to the television receiver viewing mode to automatically enable this viewing mode when the television receiver is again turned on. Capacitor 48, diode 49 and resistor 50, one terminal of which is connected to neutral ground potential, provide a positive pulse to the base of NPN transistor 38 to reset flip-flop circuit 24 which then provides the output signal to switches 32 and 34 for the television signal viewing mode of operation. A collector load for transistor 38 is provided by resistor 58 with resistor 52 providing a collector voltage on transistor 38 to limit the base voltage of transistor 40.

A B+ voltage of 15 VDC is provided to transistors 38 and 40 for energizing flip-flop circuit 24 through resistors 58 and 66. Resistors 58 and 66 provide voltage reduction such that the collectors of transistors 38 and 40 operate at approximately at 7.5 V. Base resistors 39 and 62 provide isolation and current limiting for transistors 38 and 40, respectively. Resistor 60 isolates the collector of transistor 40 to prevent back current flowing into the collector of transistor 40. Capacitors 56 and 64 provide signal filtering in flip-flop circuit 24 and removing noise spikes produced therein. This reduces the likelihood of false triggering of one-shot multivibrator 26 by a spurious input provided by flip-flop circuit 24. The output of flip-flop circuit 24 to relay 28 is provided at the collector of transistor 40.

The timer initiation signal to multivibrator 26 is also provided by the collector of transistor 40. This timer initiation signal is provided to multivibrator 26 through diode 90, coupling capacitor 80 and grounded resistor 78 which develop a pulse from the output of the collector of transistor 40 and apply it to the base of transistor 42 in multivibrator 26. Diode 90 also acts as a blocking diode to prevent the current in the base of transistor 42 from returning to the collector of transistor 40. A B+ voltage of 15 VDC is applied to the collectors of transistors 42 and 44 through resistors 68 and 88, respectively. Resistors 68 and 88 thus act as a collector load for transistors 42 and 44. Resistor 76 couples the collector of transistor 42 to neutral ground potential and thus limits the maximum voltage of the collector of NPN transistor 42.

Capacitor 72 couples the collector of transistor 42 to the base of NPN transistor 44 and, in combination with resistor 70, establishes the timing of one-shot multivibrator 26. Resistor 70 is the main charging resistor in establishing the time constant of multivibrator 26 and the values of these components in a preferred embodiment of the present invention are selected so as to provide five minutes of operation following the delivery of a drive pulse to multivibrator 26 from flip-flop circuit 24. Capacitor 71 provides noise de-spiking of the control signal provided to multivibrator 26 by television receiver control switch 18. This filtering action reduces the possibility of false triggering of multivibrator 26.

When the positive pulse from the collector of transistor 40 of flip-flop circuit 24 is provided to the base of transistor 42, it is also delivered through resistor 74 to the collector of transistor 44 in multivibrator 26. Resistor 74 provides base current limiting for transistor 42 with transistor 44 rendered non-conducting while capacitor 72 is in a charged state. However, when capacitor 72 fully discharges as determined by the time constant established by the values of capacitor 72 and resistor 70, transistor 44 is rendered conductive with the output signal from multivibrator 26 provided to relay 30. An input signal to multivibrator 26 is provided from television receiver control switch 18 through resistor 82 to the base of PNP transistor 46. Resistor 82 limits the base current through transistor 46 when the television receiver control switch 18 is selected in changing from the video camera display mode to the television signal display mode. Diode 54 performs a current steering function such that the current in the base of transistor 38 in flip-flop circuit 24 cannot pull current from the base of transistor 46. Resistor 84 serves to limit the emitter current of transistor 46 so as to avoid burn-out of transistor 46. Filter capacitor 86 serves to short out resistor 84 when transistor 46 turns on which permits capacitor 72 to discharge very rapidly when the television receiver control switch 18 is selected.

Thus, a positive input pulse is provided to the base of transistor 42 in multivibrator 26 from the collector of transistor 40 in flip-flop circuit 24. This input pulse activates multivibrator 26 in an oscillating state for a period determined by the values of charging resistor 70 and capacitor 72. During this period transistor 44 is off since its collector is high and an output signal is provided from multivibrator 26 to relay 30 for temporarily turning on the television security system 10 of the present invention. When capacitor 72 fully discharges, transistor 42 ceases to conduct, the high collector voltage of transistor 44 is removed, and the energizing signal provided to relay 30 terminates resulting in the turn off of television security system 10.

In a practical example of the present invention, the following values are assigned to various components of the doorbell actuated television security system to provide the previously discussed system control and operation:

| Reference No. | Preferred Value |
| --- | --- |
| 48 | 10 Microfarads |
| 50 | 39 Kilohms |
| 52 | 10 Kilohms |
| 56 | 0.15 Microfarads |
| 58 | 10 Kilohms |
| 60 | 18 Kilohms |
| 62 | 18 Kilohms |
| 64 | 0.15 Microfarads |
| 66 | 8.2 Kilohms |
| 68 | 2.2 Kilohms |
| 70 | 470 Kilohms |
| 71 | 0.0047 Microfarads |
| 72 | 1000 Microfarads |
| 74 | 18 Kilohms |
| 76 | 33 Kilohms |
| 78 | 39 Kilohms |
| 80 | 4.7 Microfarads |
| 82 | 10 Kilohms |
| 84 | 680 Ohms |
| 86 | 2.2 Farads |
| 88 | 10 Kilohms |

There has thus been shown a doorbell actuated television security system which provides for the automatic display upon doorbell actuation of a video presentation provided by a remotely located video camera on a conventional television receiver. Following a predetermined time interval after doorbell actuation, the system automatically turns off. Provision is also made for the manual selection of either the video camera or received television signal mode of operation.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A doorbell actuated video and audio security system comprising:
    a video camera;
    a television receiver including a power switch, video and audio signal processing circuitry, a video display and audio speaker/microphone combination, said television receiver coupled to said video camera for receiving and displaying video information therefrom;
    an intercom system coupling a speaker/microphone combination located in the general vicinity of said video camera to the audio speaker/microphone in said television receiver;
    first bistable switching means coupled to said doorbell for turning on said television receiver and providing camera video information and intercom audio signals thereto if said power switch is OFF; and
    second switching means coupled to said doorbell and responsive to the actuation thereof for switching the input to said television receiver video and audio signal processing circuitry from received television signals to said camera video information and intercom audio signals, respectively, if said power switch is ON when said doorbell is actuated.

2. A security system as in claim 1 wherein said first switching means includes a flip-flop circuit set at the actuation of said doorbell and reset by a signal from said power switch indicating that said television receiver is off.

3. A security system as in claim 2 wherein said first switching means further includes first and second relay means coupled to said flip-flop circuit and actuated by an output signal therefrom, said first relay means coupling said camera video information and said second relay means coupling said intercom audio signals to the video and audio signal processing circuitry, respectively, of said television receiver.

4. A security system as in claim 1 wherein said second switching means includes timed switching means coupled to said television receiver power switch for turning on said television receiver when said doorbell is actuated and for automatically turning off said television receiver following a predetermined time interval after doorbell actuation.

5. A security system as in claim 4 wherein said timed switching means comprises coupled transistors in a one-shot multivibrator configuration having a time constant equal to said predetermined time interval.

6. A security system as in claim 5 wherein said second switching means further includes third relay means coupling said timed switching means to said television receiver power switch for energizing said television receiver.

7. A doorbell actuated video and audio security system comprising:
    a video camera;
    a television receiver including a power switch, video and audio signal processing circuitry, a video display and audio speaker/microphone combination, said television receiver coupled to said video camera for receiving and displaying video information therefrom;
    an intercom system coupling a speaker/microphone combination located in the general vicinity of said video camera to the audio speaker/microphone in said television receiver;
    first switching means coupling said doorbell to said television receiver, said first switching means including:

a flip-flop circuit set at the actuation of said doorbell and reset by a signal from said power switch indicating that said television receiver is off; and first and second relay means coupled to said flip-flop circuit and actuated by an output signal therefrom, said first relay means coupling said camera video information to the video signal processing circuitry of said television receiver and said second relay means coupling said intercom audio signals to the audio signal processing circuitry of said television receiver for switching the input to said television receiver video and audio signal processing circuitry from received television signals to camera video information and intercom audio signals, respectively, if said power switch is ON when said doorbell is actuated;

second switching means coupled to said first switching means and responsive to an output therefrom, said second switching means including timed switching means coupled to said first switching means and third relay means coupled to said timed switching means and to said television receiver power switch for turning on said television receiver for a predetermined time period following doorbell actuation if said power switch is OFF;

camera control switch means coupling said television receiver to said first switching means for manually switching said television receiver to the video camera viewing mode; and television control switch means coupling said television receiver to said first switching means for manually switching said television receiver from the video camera viewing mode to the received television signal viewing mode.

* * * * *

Dedication 4,370,675.—*William E. Cohn*, Skokie, Ill. DOORBELL ACTUATED TELEVISION SECURITY SYSTEM. Patent dated Jan. 25, 1983. Dedication filed Apr. 25, 1983, by the assignee, *Zenith Radio Corp.*

Hereby dedicates to the Public the entire remaining term of said patent.
[*Official Gazette June 21, 1983.*]